(12) United States Patent
Jackson

(10) Patent No.: US 7,391,635 B2
(45) Date of Patent: Jun. 24, 2008

(54) METHOD AND APPARATUS FOR VARIABLE-RESOLUTION MEMORY

(75) Inventor: Warren Bruce Jackson, San Francisco, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 114 days.

(21) Appl. No.: 11/265,397

(22) Filed: Nov. 1, 2005

(65) Prior Publication Data

US 2007/0101072 A1 May 3, 2007

(51) Int. Cl.
*G11C 5/02* (2006.01)
(52) U.S. Cl. ............... 365/52; 365/189.011; 365/189.04
(58) Field of Classification Search .................. 365/52, 365/189.011, 189.04
See application file for complete search history.

(56) References Cited

U.S. PATENT DOCUMENTS

2004/0196704 A1* 10/2004 Andrei et al. ............... 365/200

* cited by examiner

*Primary Examiner*—Thong Q Le

(57) ABSTRACT

An apparatus and method for storage and retrieval of memory content including a storage structure containing a plurality of memory elements addressable as a two-dimensional array of memory content values, a reading circuit capable of retrieving the memory content values from a region of the two-dimensional array varying in size according to the desired memory readout resolution, an aggregating circuit capable of totaling the memory content values of the memory elements addressed by the reading circuit to produce an aggregate memory content value and a normalizing circuit capable of scaling the aggregate memory content value according to the number of memory elements in the contiguous region to produce an average memory content value of the desired memory readout resolution.

31 Claims, 7 Drawing Sheets

ME THOD AND APPARATUS FOR
VARIABLE-RESOLUTION MEMORY

BACKGROUND

Aspects of the present invention relate to memory storage and retrieval. Memory storage devices are used in many modern devices, including personal computers, cameras and web servers. Removable storage such as memory sticks, multimedia cards, and CompactFlash are useful not only for storing the information but for moving the data between different devices. In either case, these storage devices may contain a variety of data including images, sound and experimental data.

Many times, content in these data files are subject to various types of computation-intensive processing. For example, digital cameras read image data from an image sensor, compress the image as JPEG, MPEG or another format and then store the resulting compressed version of the image in a memory device. The compressed version of the image takes less storage and requires less communication bandwidth to transport yet has increased computational requirements.

Reading compressed images and data takes time as the entire image is read from memory, uncompressed and then viewed as a series of successive refinements in resolution. Latency for viewing a batch of images on a camera or other device using flash type memory is often noticeable due to the slow access times of this medium. Often the image is displayed briefly for a user to decide whether to delete, download or transfer the image from the camera to a computer or other device. Unfortunately, the fine details of an image—which take time to access and generate—are often discarded once the user has made a selection.

One conventional approach to this problem is to create a thumbnail copy of the image for quicker access. Thumbnails are useful for display in an image directory or use in dynamically-formatted web pages. However, thumbnails require the allocation of additional memory for each of the underlying images. Further, having multiple copies of the same image (i.e., one full scale image and a thumbnail copy) requires tracking changes from the full scale image and propagating those changes between the two or more versions of the same image. Tracking the images and making sure the thumbnails are updated to accurately reflect the full scale image requires additional processing and data management. Additionally, the resolution of both the thumbnail and the full version may also need to be scaled to the display, bandwidth and processing capabilities of different applications and display devices.

An image displayed by successive refinement propagation appears first in low-resolution and then in successively finer resolution as more image data arrives. Wavelet compression achieves this successive refinement from a coarse resolution image to a fine version without a significant burden on the transmission resources and network. However, wavelet compression does have significant computational requirements on the devices involved in these refinement operations.

Conventional datastorage and retrieval burden general-purpose processors and dedicated computing hardware with compression, decompression, thumbnail creation and many other tasks. This reduces the processor cycles available to perform other tasks or requires more powerful processors with increased device complexity, power consumption and cost.

BRIEF DESCRIPTION OF THE DRAWINGS

The present invention is illustrated by way of example and not limitation in the figures of the accompanying drawings in which.

SUMMARY

Figure 1:
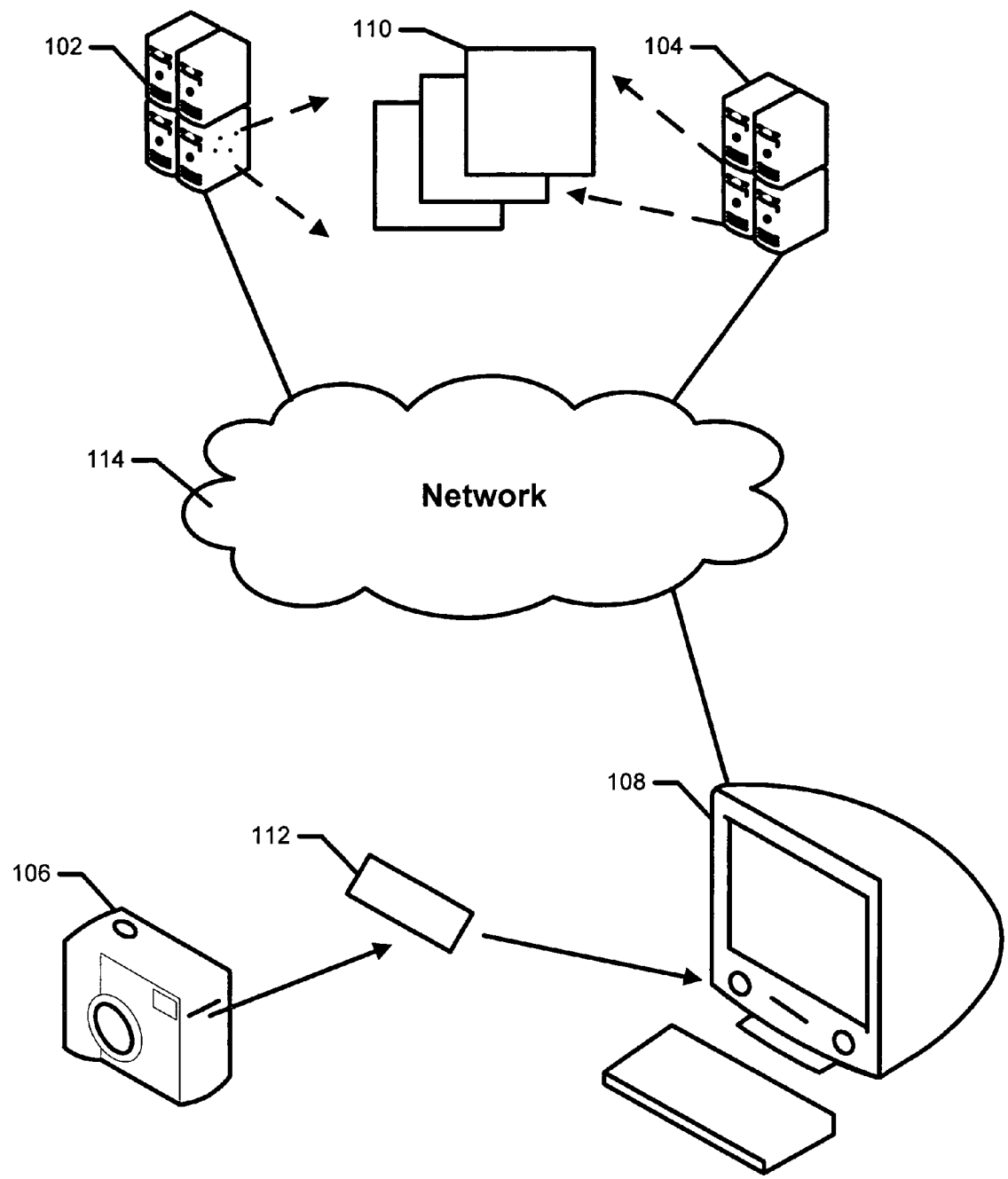
FIG. 1 is a schematic illustrating a removable storage for a camera, a PC, and in a World Wide Web server in accordance with various aspects of the present invention.

One aspect of the present invention describes a memory apparatus including a storage structure containing a plurality of memory elements addressable as a two-dimensional array capable of containing memory content values, a reading circuit capable of retrieving the memory content values of one or more of the memory elements in a region varying in size according to the desired memory readout resolution.

Yet another aspect of the invention includes a method for reading memory content at variable-resolutions. The read operations includes reading memory content values from one or more of the memory elements in a contiguous region of a two-dimensional array according to a desired memory readout resolution, aggregating the memory content values of the memory elements in the contiguous region to produce an aggregate memory content value and normalizing the aggregate memory content value by scaling it according to the number of memory elements in the contiguous region to produce an average memory content value of the desired memory readout resolution.

Another aspect of the present invention describes a method for writing to a variable-resolution memory, including receiving content in an initial format for a desired processing, identifying a two-dimensional-array format for the content, wherein the property that averaging over a contiguous region of the basis performs the desired processing, transforming the memory content into a format compatible with a variable-resolution memory in the two-dimensional-array basis, and storing the memory content in a variable-resolution memory.

DETAILED DESCRIPTION

A variable-resolution memory and method for using the same are described herein in accordance with embodiments of the present invention. While there are many advantages of the variable-resolution memory contemplated, one or more of the advantages of this variable-resolution memory are included below for purposes of explanation and understanding. In general, the variable-resolution memory obviates subsequent computational requirements for data access, compression and other data operations by aggregating data read from the memory. Aggregating data in turn effectively increases memory retrieval speeds for many different types of images and data sets.

A variable-resolution memory and access method provides a rapid means of creating thumbnails and compressed images by reducing the quantity of read operations and compression operations performed on large datasets. Variable-resolution memory implemented in accordance with aspects of the present invention can access an image at many different resolutions from lower or coarser granularity up to much higher and finer resolutions without necessarily retrieving the entire image in each instance.

Reduced network or bus bandwidth is yet another advantage of using variable-resolution memory and access methodologies. The amount of data being transmitted is less for lower resolution images and datasets even when the underlying data associated with the image and dataset may be of a significantly higher resolution or density. Consequently, more images and datasets can be accessed thus freeing up the network or bus bandwidth for other more critical or demanding processing concerns.

FIG. 1 is a schematic illustrating a web server 102 and a remote storage server 104, a camera 106, a personal computer (PC) 108, an internal variable resolution memory (VRM) 110, a removable VRM 112 in accordance with various embodiments of the present invention. Depending on the particular implementation, a VRM designed in accordance with implementations of the present invention can be a removable VRM 112 useful in transporting associated data between camera 106, computer 108 and any other device compatible with removable VRM 112. The VRM can also be implemented as an internal VRM 110 used as memory, cache or other storage and integrated into the motherboard or other electronics making up web server 102 or remote storage server 104.

It is also contemplated that embodiments of the VRM can also be used in conjunction with charged coupled devices (CCD), CMOS based and other types of sensors to store captured image data. For example, CCD and CMOS based image sensors would be used in camera 106 to convert photons into appropriate current or charge levels. Once captured, image data using the VRM can be provided at various resolutions rather than a single resolution using embodiments of the present invention. Other types of sensors used to gather sound rather than light can also use embodiments of the present invention. Accordingly, embodiments of the present invention are not limited to discrete storage devices but can also be used in conjunction with sensors or other data gathering devices that store data in the VRM as a buffer, for a brief period of time or temporarily before being transmitted over a bus, interconnect or other transmission medium for further processing.

Removable VRM 112 can be implemented using any number of different form factors used for removable storage devices including: Memory Sticks, secure digital (SD), smart media (SM), multimedia card (MMC), xD picture cards and any other form factor available now or in the future. Removable VRM 112 is useful when it is necessary to move a storage device between camera 106, computer 108 or anything else with the capacity to retrieve/store information from removable VRM 112. Devices or systems that can benefit from removable VRM 112 include a computer server, a game machine, a camera, a printer or other devices.

Network 114 can be any sort of network capable of transmitting image and other data information. In the case network 114 is the Internet, web server 102 may be used to host a website for use on the World Wide Web (WWW) requiring frequent transmission of compressed images and thumbnails. An increasing number of web servers need to quickly render images in varying resolutions to support the diverse image processing and transmission capabilities associated with a group of heterogeneous remote devices.

To accommodate these demands more efficiently, web server 102 uses internal VRM 110 designed in accordance with implementations of the present invention and integrated into web server 102. Internal VRM 110 may be built from a volatile memory storage technology such as RAM, from a nonvolatile technology such as flash, MRAM or from a write-once read-many (WORM) technology. Internal VRM 110 may for instance be a component installed on the motherboard, cache or resident on a card installed as a bus attached device. Aspects of the present invention enable web server 102 to transmit images at a resolution appropriate for camera 106, remote computer 108 or other heterogeneous device. Instead of computing different resolutions of data, the access to internal VRM 112 is varied depending on the resolution desired. The resolution and size of each image can be tailored to the various devices according to the specific screen resolution, storage capacity and network bandwidth capabilities these devices are capable of handling.

In operation, camera 106 stores pixel-by-pixel image data directly onto removable VRM 112 at the highest resolution or finest granularity. Using implementations of the present invention, data can be read from removable VRM 112 at various specified resolutions ranging from the highest resolution down to lower resolutions used to represent thumbnails or other datasets with coarser data granularity requirements. For example, a person browsing images on camera 106 may request previewing lower resolution thumbnails from removable VRM 112 to quickly identify certain photos of interest.

Based on the thumbnail, the user may then request a higher resolution version of the image from removable VRM 112 by reading the data at a higher resolution. Computational requirements from the processor associated with camera 106 are nominal to complete this operation as the desired image resolution is extracted directly from removable VRM 112. The higher resolution images can be transmitted over network 114 for archival storage on remote storage service 104 or for display using web based applications running on web server 102. Remote storage service 104 can store the higher resolution images on internal VRM 110 making them available at variable resolutions on demand or can compute one or several compressed versions of the images using conventional compression routines.

Figure 2:
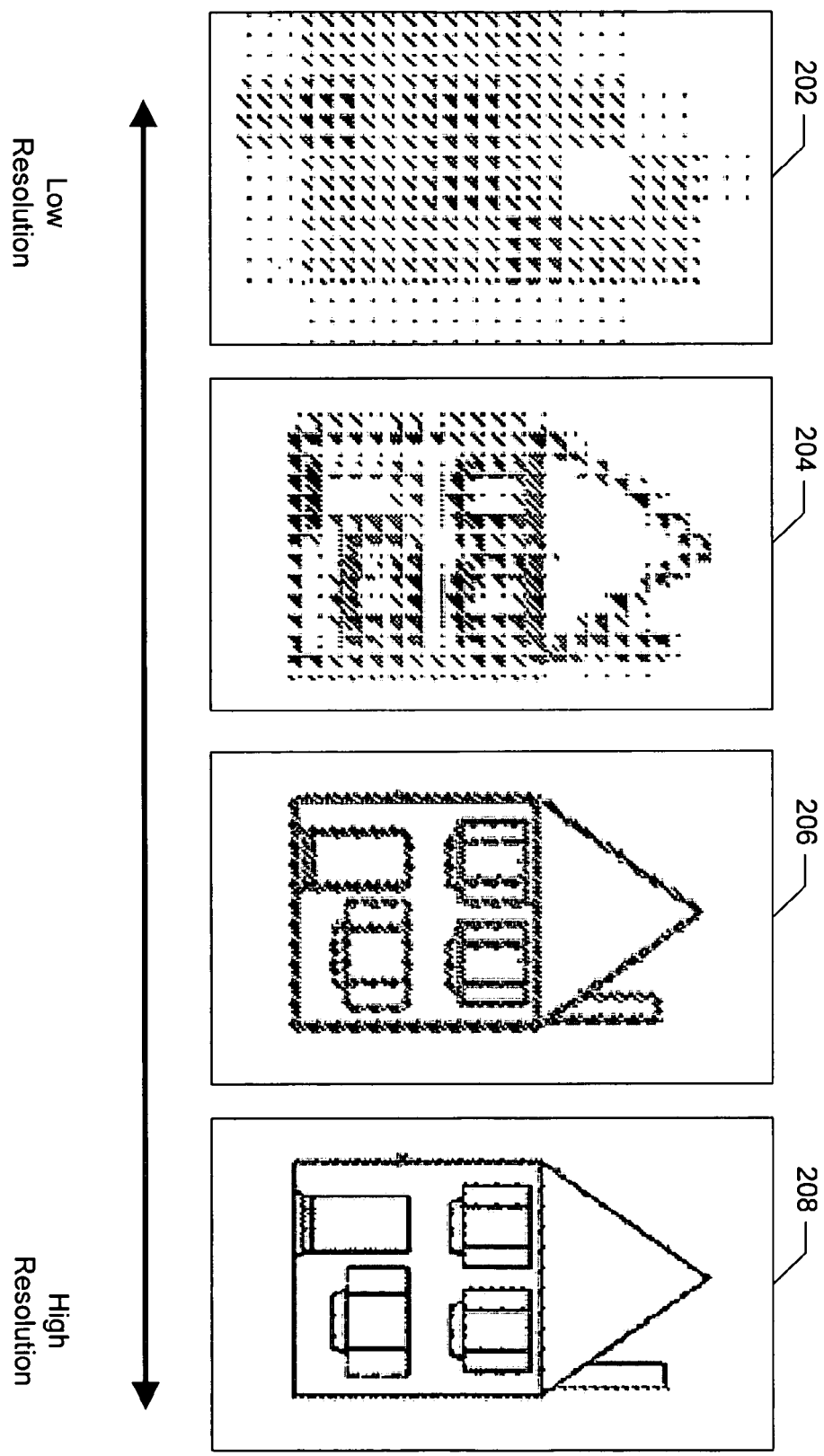
FIG. 2 illustrates an image being read at successively higher resolutions from a variable-resolution memory in accordance with aspects of the present invention.

FIG. 2 illustrates an image being read at successively higher resolutions from the VRM in accordance with aspects of the present invention. Each of the images 202, 204, 206 and 208 represent the results of reading from a VRM at successively higher resolutions. Image 202 represents the image resulting from a lower resolution or coarser readout of the VRM. A memory controller for the VRM requests this lower resolution result by sending certain control signals to the VRM. The VRM in turn generates the requested lower resolution image efficiently using analog circuitry and without burdening an external processor. For example, the lower resolution readout can be achieved by dividing the VRM into a 5 by 8 grid of 40 points and providing a value for each point representative of the corresponding entries covered by the grid section rather than the full resolution image stored in the VRM. For example, this representative value can be an average of the values in the grid section.

In comparison, image 204 represents a higher resolution or less coarse readout from the VRM. Compared to the coarser image 202, image 204 may be obtained by instead accessing the image through a higher resolution 10 by 16 grid of 160 points overlay on the VRM and a different representative value. For example, this higher resolution grid samples 160 points versus only 40 points from the coarser version of the image and performs an averaging of the corresponding values. Accessing the VRM at this higher resolution can be very useful when thumbnails of images or directory structure icons are desired without the finest details.

Image 206 represents an even higher resolution or still less coarse image by accessing a larger grid of points within the VRM. For example, this higher resolution image can be obtained by reading directly from a 20 by 32 grid having 640 points. Once again, the memory controller would access the VRM requesting data points computed using analog circuitry to sample and average values over the 20 by 32 grid. By requesting the higher resolution data directly, averaged values for each point on the grid are produced with analog circuitry leaving computational capabilities associated with the processor of the device for other purposes.

In comparison, image 208 represents reading each data point in the VRM thus producing the highest resolution image. In this example, a 40 by 64 grid having 1280 points provides access to each point of the image stored in the VRM pixel-by-pixel. In this latter case, the highest-resolution image is accessed and may be left uncompressed and transmitted at full resolution or may be compressed using conventional computational methods and transmitted using less bandwidth.

Figure 3A:
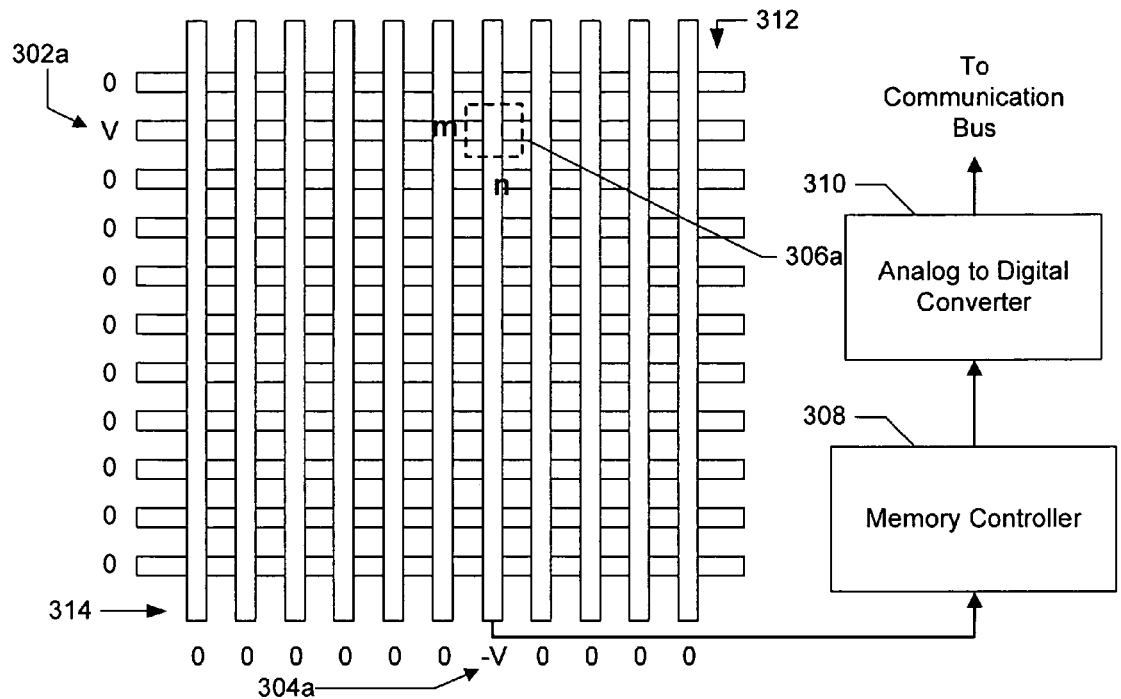
FIG. 3A is a schematic of a crosspoint memory structure being read at a single memory location in accordance with aspects of the present invention.

FIG. 3A is a schematic of a crosspoint memory 312 being read at a single memory location in accordance with aspects of the present invention. Reading a single memory location corresponds to reading data in crosspoint memory 312 at the highest or full resolution. In this illustrated embodiment, crosspoint memory structure 312 includes a set of horizontal control lines 302a underneath a set of vertical control lines 304a, and a memory store (not shown) at each intersection of control lines for storing a memory content value. While the schematic in FIG. 3A and elsewhere is a crosspoint memory 312, memory elements can be implemented as 3-terminal transistor type devices, 2-terminal diode based deices as well as any other device type used in memory storage. A memory controller 308 and an analog-to-digital converter 310 are used to read crosspoint memory 312.

Selectively creating a voltage bias across the corresponding horizontal wire 302a and the corresponding vertical wire 304a creates a resulting current sensed by memory controller 308. Reading the value of memory element at position 306a in cross-point memory 312 depends on the current detected and the m×n area of memory being sensed. Sense amps for cross point memory 312 can separate discrete elements coupled to memory controller 308 or incorporated into memory controller 308. Memory controller 308 performs many functions including aggregating memory content values and normalizing the aggregate values by scaling values to the number of memory elements being read.

In this case, the area is one memory store so memory controller 308 collects a single value and does not perform averaging or other types of normalization of the data. In FIG. 3A, the value detected at position 306a corresponds directly to the value contained therein as the crosspoint memory 312 is being read at the highest or full resolution. Analog-to-digital converter 310 converts the analog signal value into a digital value suitable for later processing.

Figure 3B:
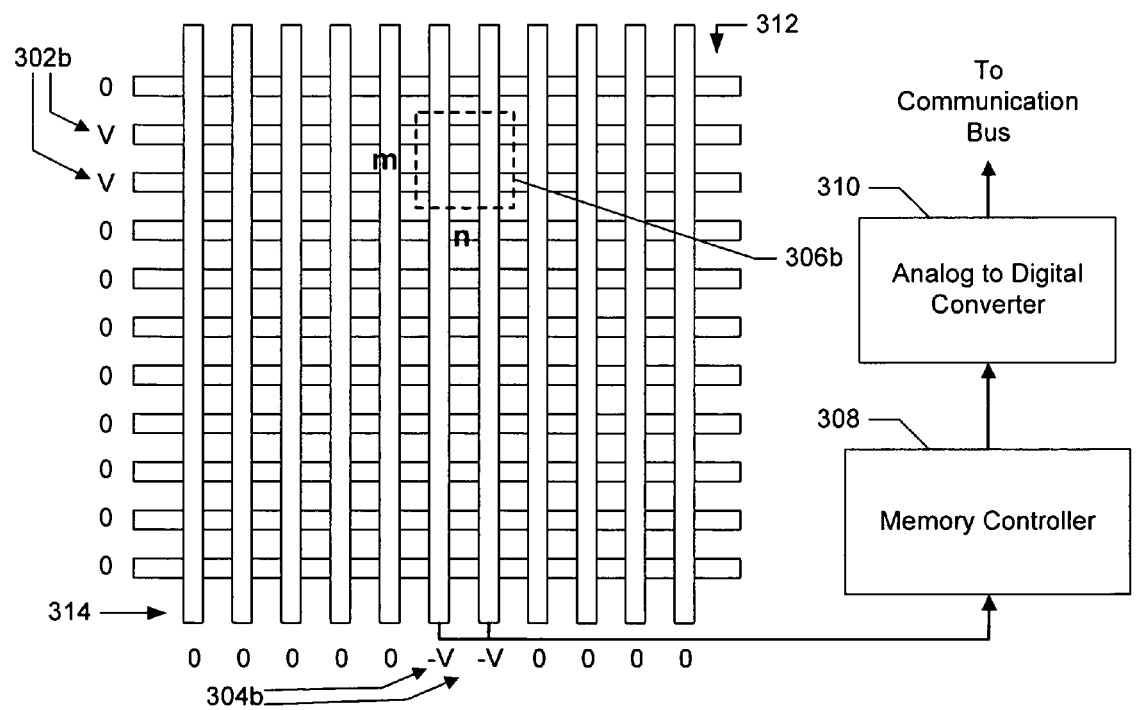
FIG. 3B is a schematic of a crosspoint memory structure being read from four memory locations as a single value in accordance with aspects of the present invention.

FIG. 3B is a schematic of a crosspoint memory structure being read from four memory locations as a single value in accordance with aspects of the present invention. Once again, crosspoint memory structure 312 includes a set of horizontal control lines 302b underneath a set of vertical control lines 304b, and a memory store (not shown) at each intersection of control lines for storing a content value. Crosspoint memory 312 further includes a memory controller 308 and an analog-to-digital converter 310.

In this example, activating two horizontal control lines 302b and two vertical control lines 304b biases four memory elements 306b accessing data stored in a larger m×n region of memory. The resulting current sensed by memory controller 308 now reflects the aggregate content or values contained in the multiple memory elements in the m×n region. Current passing to memory controller 308 is processed using analog circuitry and produces a value representative of the region. For example, analog circuitry in memory controller 308 can generate an average value based on the four memory stores in the area and the aggregate value read or sensed.

In one embodiment, the analog element may utilize a variable resistor that scales the current in proportion to the number of memory elements addressed in the m×n region. Scaling the current in analog to estimate values of the memory elements is more efficient than accessing all the data in a much larger region and then reducing the resolution to representative aggregate values using digital processing techniques. This process effectively creates an output value according to the formula in Equation 1 below:

$$I_{mn} \propto \frac{\sum_{i=1}^{m \cdot n} M_{mn}}{m \cdot n} \qquad \text{Equation 1}$$

Where:

$I_{mn}$ is an average current covered by area $m \times n$ $M_{mn}$ is individual memory value at each individual position within area $m \times n$ $m \cdot n$ is the area of the memory structure being measured and used to compute current.

Memory controller 308 processes the analog signal and creates a representative aggregate value. This representative aggregate value is then passed to analog-to-digital converter 310 and onto a communication bus where subsequent digital processing of the resulting information occurs. Analog-to-digital converter 310 can also include a circuit that rounds the representative aggregate value to a desired significant number of digits. The number of significant digits may vary linearly or asymptotically in accordance with the number of memory elements addressed. For example, the number of significant digits in an asymptotic relationship may approach a maximum degree of accuracy as the number of memory elements are increased beyond a certain threshold. Control over rounding the resulting floating point results can be controlled automatically or by way of a control signal specified in application or in hardware.

Reading multiple memory elements from crosspoint memory 304 in FIG. 3B may be useful in the creation of a one-quarter-resolution image. Instead of computing the lower resolution image from a full-resolution version, aspects of the present invention directly obtain the lower resolution data by accessing the VRM in blocks. Reading groups of four pixels at a time and averaging the result in analog circuitry effectively reduces the resolution of the resulting image as well as the bandwidth required to transmit the results over a communication bus. Alternatively, reading groups of four or more pixels at a time could be for purposes of creating a compressed image. These compression computations operate by creating aggregates of values from the pixels in a region of pixel values of an image. Further details on these types of compression computations using the VRM are described later herein.

Figure 3C:
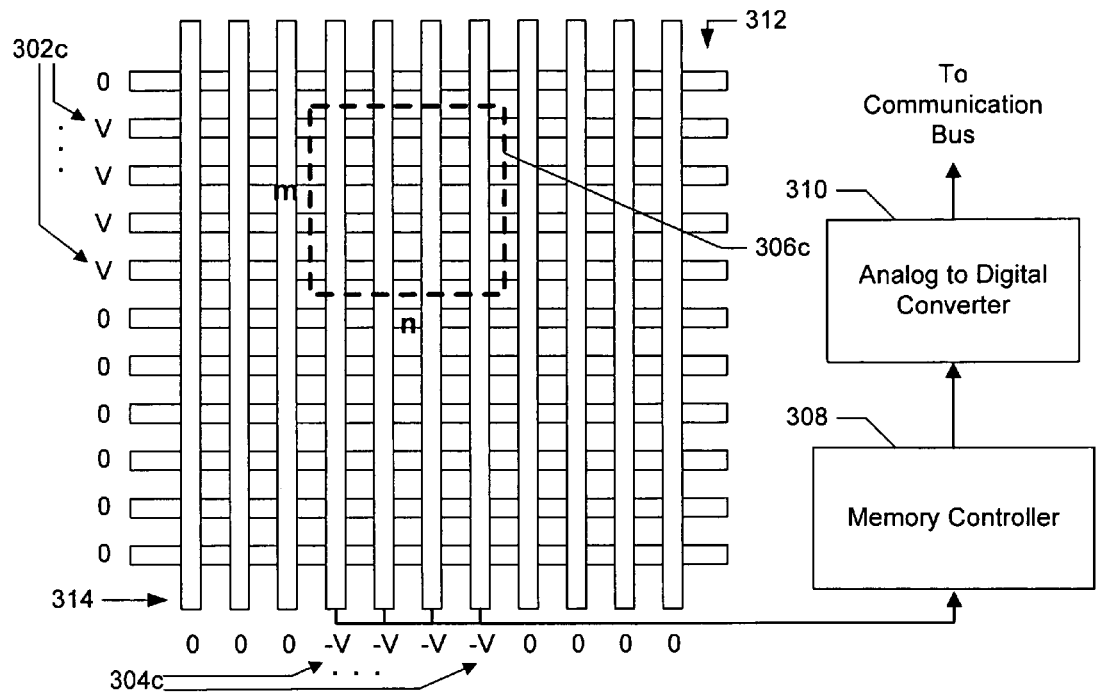
FIG. 3C is a schematic of a crosspoint memory structure being read from sixteen memory locations as a single value in accordance with aspects of the present invention.

FIG. 3C is a schematic of a crosspoint memory structure being read from sixteen memory locations as a single value in accordance with aspects of the present invention. This embodiment of the present invention provides an even lower resolution readout of the contents of a VRM. Instead of two vertical and horizontal control lines, FIG. 3C illustrates operating four horizontal control lines 302c and four vertical control lines 304c to bias and access sixteen memory elements 306c in the area m×n. In this particular embodiment, the sixteen values associated with the sixteen memory elements are processed in analog by memory controller 308 and represented as a single value. This processing represents a reduction in resolution equivalent to one-sixteenth of a full resolution of an image without external processing. It may also correspond up to a sixteen fold increase in the speed it would otherwise take to access the full resolution of an image depending on the memory access characteristics of crosspoint memory 312.

Figure 3D:
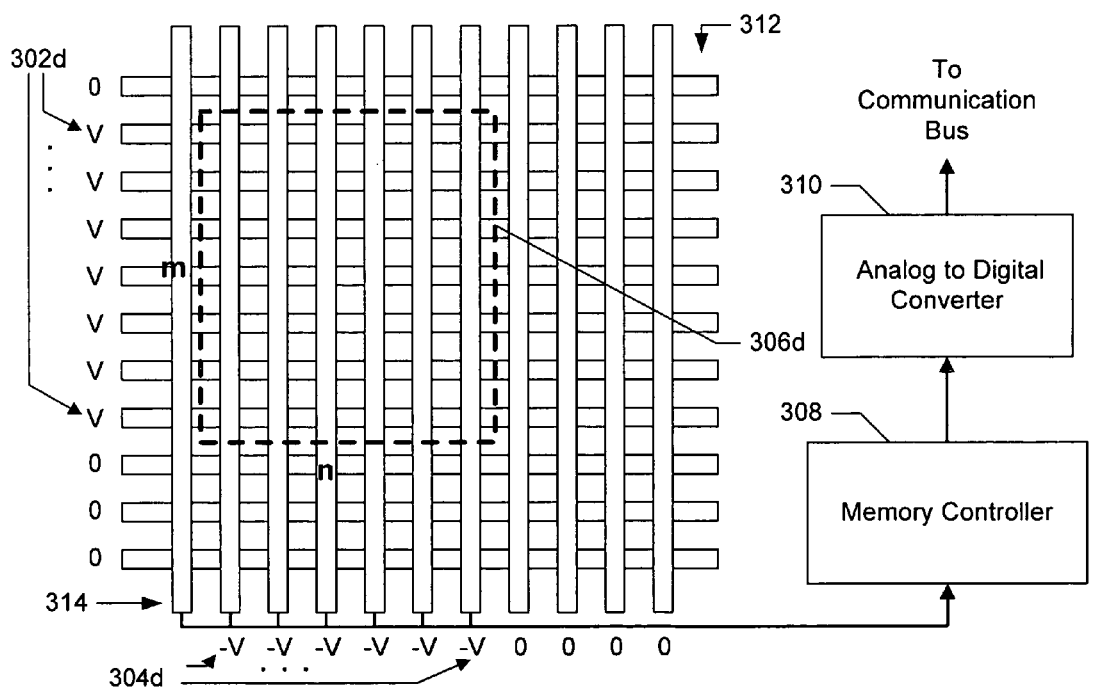
FIG. 3D depicts schematically reading from a crosspoint memory structure the values from forty-two memory element as a single value in accordance with embodiments of the present invention.

Each of FIG. 3A, FIG. 3B, and FIG. 3C depict various embodiments of the present invention reading square regions of one, four, and sixteen memory elements, respectively. However, it is contemplated that the regions being read should not be limited to only square or symmetric areas. Moreover, it is also not required that the reduction in resolution along each linear dimension is computed as factor of two but instead can be any integer factor as defined by the number of memory rows and columns accessed. Accordingly, FIG. 3D is provided to illustrate the flexibility and accommodation that embodiments of the present invention can be configured to handle. For example, FIG. 3D depicts schematically reading the values from forty-two memory element as a single value in accordance with embodiments of the present invention. The region being read is defined by six horizontal control lines 302d and seven vertical control lines 304d. Memory controller 308 senses the current produced by the memory elements associated with the region m×n in FIG. 3D and generates a representative signal value based upon the 42 memory elements being read. Variable resolution analog to digital converter 310 then converts the resulting analog signal into a digital signal that is transmitted over a communication bus for further processing and communication.

Figure 4:
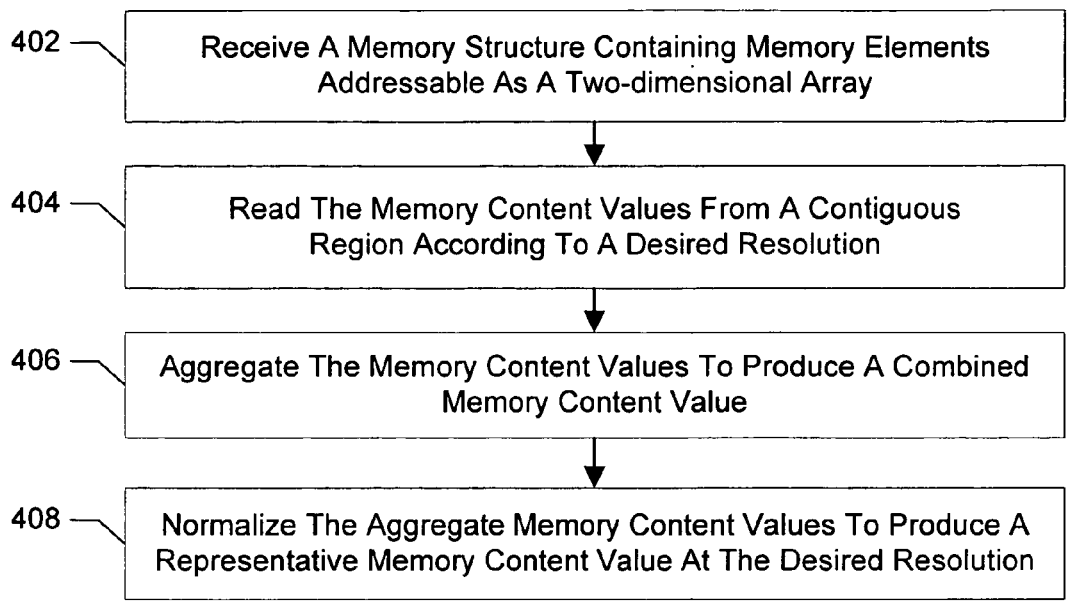
FIG. 4 is a flowchart depicting a read operation from a variable-resolution memory performed in accordance with aspects of the present invention.

FIG. 4 is a flowchart showing the operations performed by one embodiment of the present invention in reading from a variable-resolution memory (VRM). The reading operation first receives a memory structure containing memory elements addressable as a two dimensional array (402). Each addressable memory elements may store analog or digital values depending on the application. As previously described, the total number of values in the memory structure represents that highest resolution or granularity of an image, sound, chemistry, telemetry data or data file of some other type.

The next operation reads the memory content values from a contiguous region according to a desired resolution (404). Higher resolution or granularity is read by making the region being read smaller while lower resolution or granularity is achieved by increasing the size of the region being read from the VRM. For example, reading a set of two-by-two blocks of values from the VRM of 16 values associated with an image eventually results in generating a one-quarter-resolution thumbnail from the full resolution image stored in the VRM.

Next, the reading operation combines the values to produce an aggregate memory content value (406). For example, a memory controller circuit designed to work with variable-resolution memory aggregates the contents of the memory elements together into a single value. This relieves external processors and other devices from the numerous computational tasks associated with reducing or increasing resolution of an image and/or compressing the associated data. For example, various embodiments of the present invention can aggregate values by measuring the aggregate current produced from a set of addressed memory elements in the VRM.

Embodiments of the present invention then normalize the aggregate memory content according to the number of memory elements in the contiguous region producing a representative memory content value of the desired memory resolution (508). One embodiment of the present invention scales down the aggregate memory content depending on the number of memory elements. This operation can also be performed using circuitry embedded in the memory controller. For example, an average value is created by dividing the aggregate value from the memory elements in the VRM by sixteen for the corresponding sixteen memory elements being read. In lieu of sixteen values, the normalization produces a single representative value to be used in the subsequent lower resolution or granularity data processing.

Figure 5:
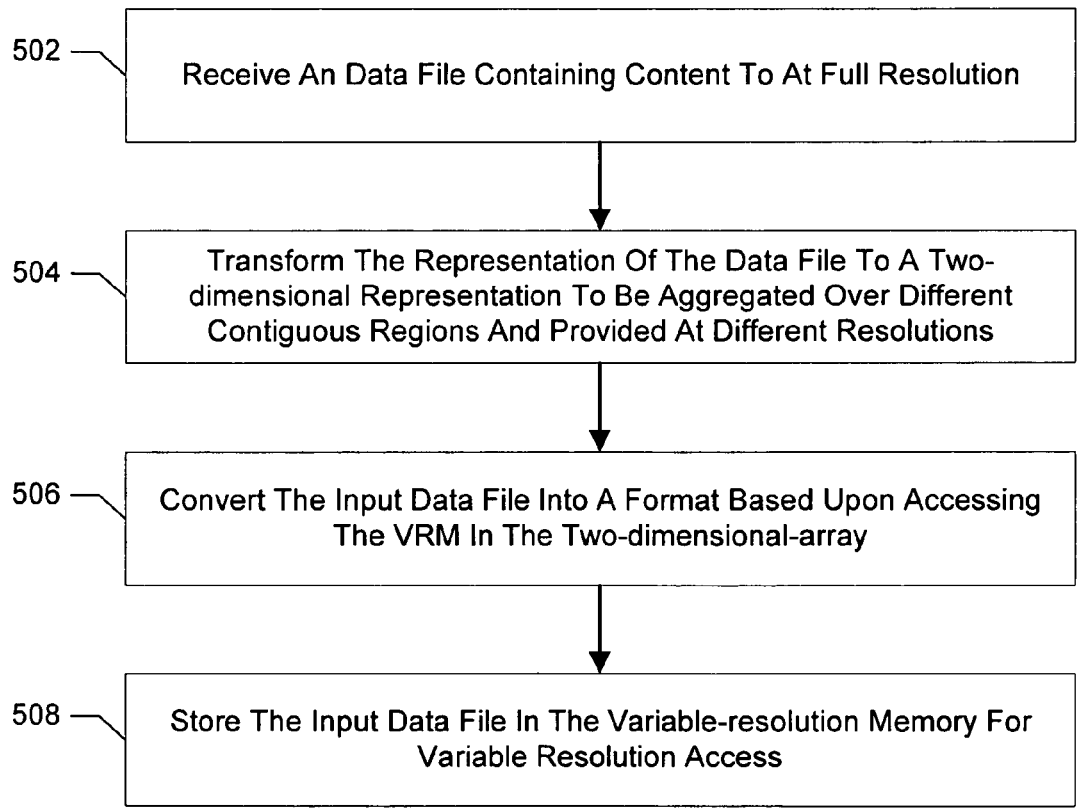
FIG. 5 is a flowchart depicting a write operation to a variable-resolution memory performed in accordance with aspects of the present invention.

FIG. 5 is a flowchart showing the operations performed by one embodiment of the present invention in writing to variable-resolution memory (VRM). As previously described, image data can be written to the VRM as a two-dimensional array of pixel values at full-resolution and read in accordance with implementations of the present invention. To lower the resolution using the VRM, image data can be aggregated and represented as values from sets of smaller two-dimensional regions. However, other types of content other than image data needs to converted into an appropriate two-dimensional representation that can be written into the VRM and read at lower resolutions. By writing the content into the VRM in the proper format, the VRM can then be used to access the content and varying resolutions. For example, audio data is one type of content that needs to be converted into an appropriate two-dimensional format for the VRM.

Accordingly, the first operation receives an input data file containing content at full resolutions (502). The data file may contain any of a variety of types of content in full resolution. For instance, the content may be a sound file or other types of content. In the case of sound data, audio information often is in a compressed format such as one making use of a Fourier sampling of frequencies. Various resolutions or granularity can include the processing of a sound file to rapidly search for particular sound levels or interruptions in the audio information. Even some image files may need converting for the VRM if they are not represented using conventional two-dimensional pixel data but some other format or representation. For instance, image data may be compressed in a jpeg or wavelet format, or some other abstract representation.

Next, the writing operation includes transforming the representation of the input data file to a two-dimensional representation to be aggregated over different contiguous regions and provide different resolutions (504). Data to be accessed from the VRM needs to be organized according to the previously described two-dimensional arrangement. The arrangement should allow contiguous regions in the two dimensions to be grouped and content aggregated depending on the desired resolution. As previously described, aggregated data values can be readily detected through analog processing and produce a representative value to replace the aggregation of individual values. For example, an averaging of data values in the VRM can be used to replace one or more of the data values at a lower resolution or granularity.

For example, a sound file stored as a two-dimensional array with one dimension representing time and another representing an intensity of frequencies over time can be converted and written to the VRM for rapid searching of for silent intervals or breaks in the sound. Likewise, targets can be searched from a radar image stored in the VRM as a two-dimensional array having one dimension representing the distance of the target and another dimension representing the angle of the target from a particular vantage point.

The next operation converts the input data file into a format based upon accessing the VRM in the two-dimensional-array (506). Finally, the variable-resolution data file is stored in a variable-resolution memory (508).

Figure 6:
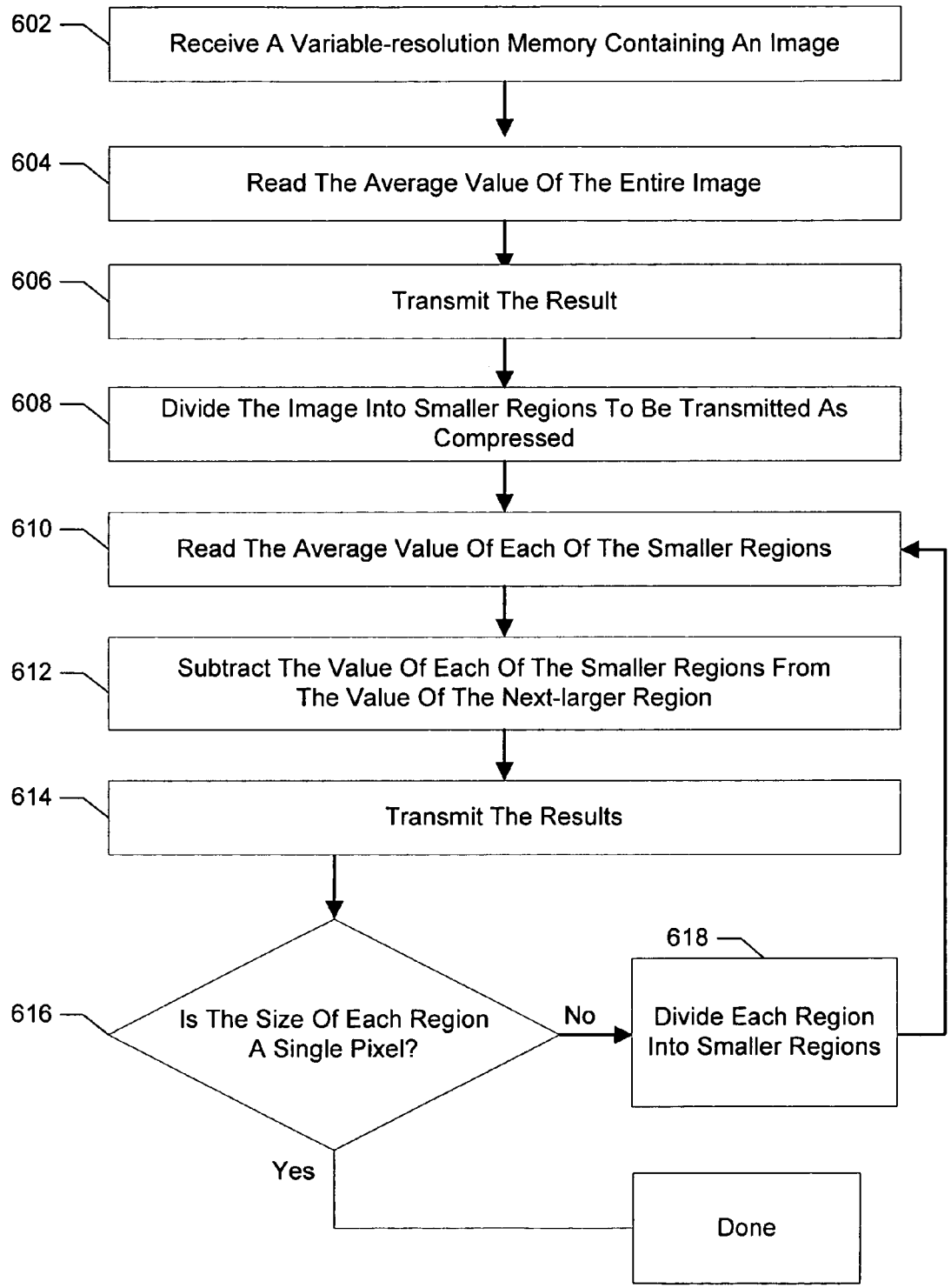
FIG. 6 is a flowchart depicting the operations performed by one embodiment of the present invention in generating and transmitting a compressed version of an image.

FIG. 6 is a flowchart showing the operations performed by one embodiment of the present invention in generating and transmitting a compressed version of an image. The operations can be executed in part or in whole by a memory controller for the VRM and/or by a processor executing instructions and transmitting control signals to the controllers for the VRM.

Initially, the transmission operation receives a VRM containing an image (602). The VRM may, for example, be a crosspoint memory structure as illustrated before containing an image. In one embodiment, each memory element contains a single pixel value in monochrome values. For simplicity the pixel values can be analog monochrome values, but other embodiments can process digital and color images by the one or more of the mechanisms described below.

Embodiments of the present invention read an aggregate value of the entire image (604). The aggregate value of the entire image is achieved efficiently by sensing all the values from each element in the VRM. This is more efficient than performing the computations later as only a single representative value need be determined and processed.

The next operation transmits the aggregated value and result of the entire image (606). Embodiments of the present invention may transmit the resulting images to a computer bus for storage as part of a compressed image in a separate memory. Alternatively, it may transmit across the Internet to web browsers for display.

Next, the operation divides the image into smaller regions to be transmitted in a compressed format (608). As previously described, a cross-point memory structure may access square or symmetric areas as well as non-symmetric areas. Additionally, dimensions along each of the dimensions of the memory structure need not be powers of two but should be based upon the dimensions of the memory or the datasets they are going to be storing.

The next operation reads the average value of each of the smaller regions (610). The one example embodiment then subtracts the value of each region from the value of the next-larger region (612). Initially, the next-larger region is the entire image and in later iterations the regions become successively smaller, as described below. The cross-point memory itself or an external processor may perform aforementioned subtraction operation.

The next operation transmits the results of each subtraction (614). Because the larger region's aggregate value has already been transmitted, the result of the subtraction communicates the actual aggregate value of the smaller regions. In one possible embodiment, the number of significant digits of the values transmitted decreases as the region size decrease. This is advantageous because the human eye has decreasing sensitivity to luminosity differences in regions of decreasing size. Less memory or transmission resources are required for the compressed version created using such an approach.

The next operation determines whether the size of each region is a single pixel (616). If the region has been reduced to a single pixel then the compression of the image is complete. Otherwise, if it is not, then an operation divides each region into smaller regions and the process continues (618). Embodiments of the present invention read the next aggregated value of each of these yet smaller regions (610) until the compressed image is complete.

Figure 7:
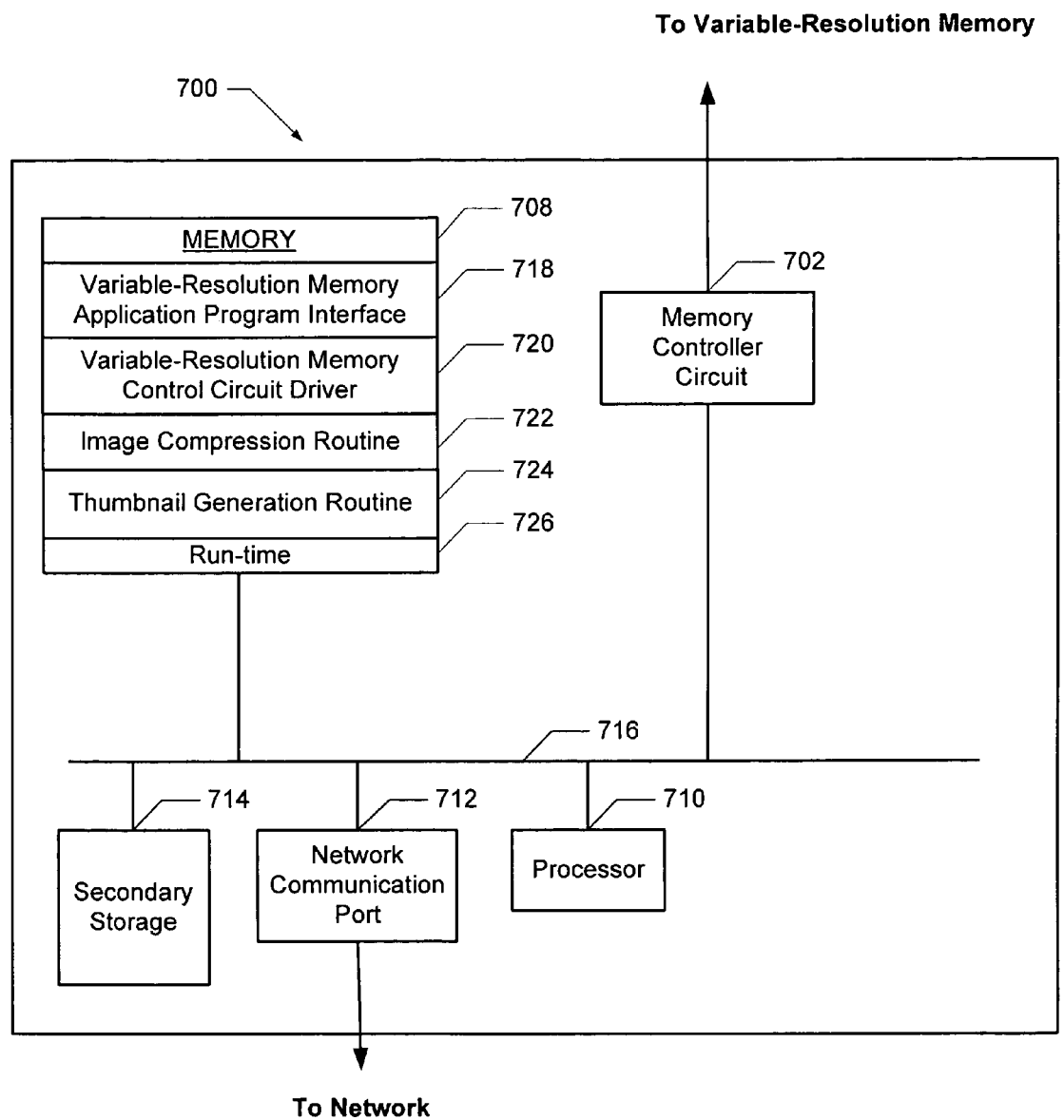
FIG. 7 is a diagram of a system implementing a variable-resolution memory in accordance with implementations of the present invention.

FIG. 7 illustrates a system for using a variable-resolution memory according to one embodiment of the present invention. System 700 includes a memory controller circuit 702, a memory 708 to hold executing programs (typically random access memory (RAM) or read-only memory (ROM) such as a flash ROM), a processor 710, a network communication port 712 for data communication, and a secondary storage 714, operatively coupled together over an interconnect 716. System 700 can be preprogrammed, in ROM, for example, using field-programmable gate array (FPGA) technology or it can be programmed (and reprogrammed) by loading a program from another source (for example, from a floppy disk, a CD-ROM, or another computer). Also, system 700 can be implemented using customized application specific integrated circuits (ASICs). A run-time 729 is used to manage on or more of the resources associated with system 700.

In one embodiment, memory 708 holds a variable-resolution memory application program interface 718, a variable-resolution memory control circuit driver 720, an image compression routine 722, and a thumbnail generation routine 724 and a run-time 726 for managing one or more of the above and other resources.

Memory controller circuit 702 exchanges digital input and output between a variable-resolution memory (not shown) and the requesting routine in memory 708 by way of interconnect 716. In one aspect, memory controller circuit 702 specifies the resolution to be read from VRM by way of certain digital/analog commands and signals. These commands and signals activate certain regions of the VRM and perform various operations to obtain the appropriate resolution data as previously described. For instance, commands and/or signals sent to the VRM can result in biasing certain horizontal and vertical control wires to access the contents of a crosspoint memory structure. In a similar manner, memory controller circuit 702 also operates in a write mode to write data to the VRM as previously described. For example, memory controller circuit 702 can place data to be written on a bus for entering data to the VRM and then bias the appropriate horizontal and vertical control wires to write the data to the VRM.

Variable-resolution memory application program interface 718 mediates between system 700 and a programming language or application. For example, the application may be a photo editing program or a web server application to be loaded into memory.

Variable-resolution memory control circuit driver 720 manages reading and writing data to the VRM through the memory controller circuit 702. These operations may include specifying to memory controller circuit 702 a specific resolution to be read from the VRM or performing one or more post-processing operations on the resulting data after it is retrieved from the VRM. Additionally, variable-resolution memory control circuit driver 720 can be used to convert certain types of content into two-dimensional or other data format suitable for writing to the VRM by way of the memory controller circuit 702.

Also included in this example implementation are two routines to often used image processing operations. Image compression routine 722 is capable of efficiently generating compressed images by making use of the advantages of the VRM structure and intrinsic processing capabilities. Likewise, thumbnail generation routine 724 also takes advantage of the processing capabilities of the VRM and requests a image resolution from the VRM suitable for use in a thumbnail image having a reduced-resolution image.

Implementations of the invention can be implemented in digital electronic circuitry, or in computer hardware, firmware, software, or in combinations of them. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs.

Thus, the invention is not limited to the specific embodiments described and illustrated above. For example, a cross-point memory with two terminals has been described schematically however these and other embodiments of the present invention can readily be implemented using three-terminal transistors and other devices having more than two terminals or two terminal diodes or other devices having two or fewer terminals. Embodiments of the present invention are not limited to images but can also be applied to sound, radar telemetry data, experimental chemical or genomic data or any other data set needing rapid access. Further, the addressable region is not limited to a square region but instead may be any rectangular region. Instead, the invention is construed according to the claims that follow and the full scope of the equivalents thereof.

What is claimed is:

1. A memory apparatus comprising:
    a storage structure containing a plurality of memory elements addressable as a two-dimensional array, each memory element capable of containing a memory content value, wherein the memory content values contain a data file selected from a set of data files including; an electronic image data file, an electronic sound data file, a chemical map data file and a radar sensing data file; and
    a memory controller circuit capable of retrieving the memory content values of one or more of the plurality of memory elements of the array in a contiguous region that varies in size according to the desired memory readout resolution.

2. The memory apparatus of claim 1, wherein the memory controller circuit further comprises:
    an aggregating circuit capable of totaling the memory contest values of the memory elements addressed by the reading circuit to produce an aggregate memory content value.

3. The memory apparatus of claim 2 wherein the memory controller circuit further comprises:
    a normalizing circuit capable of scaling the aggregate memory content value according to the number of memory elements in the contiguous region to produce a representative memory content value of the desired memory readout resolution.

4. The apparatus of claim 1, wherein the plurality of memory elements are selected from a set of memory elements including: PROM, EPROM, EEPROM, magnetic storage memory, ROM, RAM, and Flash.

5. The apparatus of claim 1, wherein the storage structure further comprises an arrangement of two-terminal devices.

6. The apparatus of claim 1, wherein the storage structure further comprises an arrangement three-terminal devices.

7. The apparatus of claim 1, wherein the memory controller circuit is capable of addressing a rectangular block of memory elements in the two-dimensional array.

8. The apparatus of claim 2, wherein the aggregating circuit further comprises an analog circuit that produces the aggregate memory content value from the memory content values.

9. The apparatus of claim 3, wherein the normalizing circuit comprises a circuit that scales the aggregate memory content value to produce an average memory content value as the representative memory content value.

10. The apparatus of claim 9, wherein the circuit scales the aggregate memory content value according to the formula $$I_{mn} \propto \frac{\sum_{i=1}^{m \cdot n} M_{mn}}{m \cdot n},$$

where m and n are the horizontal and vertical indices of a region and $M_{mn}$ is the value of each memory element.

11. The apparatus of claim 9, wherein the circuit further comprises a variable resistor that receives as input a current representing the aggregate memory content value and a current representing the number of memory elements in the rectangular block of memory elements, and produces as output a current representing the average memory content value of the rectangular block of memory elements.

12. The apparatus of claim 9, further comprising:
an analog-to-digital converter that produces a digital average memory content value from the average memory contest value.

13. The apparatus of claim 12, wherein the digital average memory content value has a variable number of digits.

14. The apparatus of claim 13, wherein the number of digits varies with the number of memory elements addressed by the reading circuit.

15. The apparatus of claim 14, wherein the number of digits varies with the number of memory elements addressed according to a relationship selected from a set of relationships including: a linear relationship with a positive slope, a step-wise relationship and an asymptotic relationship approaching a constant value as the number of memory elements increases.

16. The apparatus of claim 14, further comprising:
a processor that executes instructions producing a compressed representation of the memory content values by causing the reading circuit to read the two-dimensional array of memory elements multiple times, from a region covering a larger region progressively down to multiple regions each comprising a single pixel, and then storing the resulting multiple average memory content values in a second memory structure.

17. A method for reading memory content at variable-resolutions comprising:
reading memory content values from one or more of the memory elements in a contiguous region of the array according to a desired memory readout resolution;
aggregating the memory content values of the memory elements in the contiguous region to produce an aggregate memory content value; and
normalizing the aggregate memory content value by scaling it according to the number of memory elements in the contiguous region to produce a representative memory content value of the desired memory readout resolution.

18. The method of claim 17, further comprising using an average memory content value as a pixel in a thumbnail image.

19. The method of claim 17, wherein the representative memory content value is an average memory content value represented as an analog value.

20. The method of claim 19, further comprising converting the analog value to a digital value.

21. The method of claim 20, wherein the digital value has a variable number of significant digits.

22. The method of claim 21, wherein the number of significant digits varies with the number of memory elements.

23. The method of claim 22, wherein the number of significant digits varies with the number of memory elements according to a relationship selected from a set of relationships including:
a linear relationship with a positive slope, a step-wise relationship, and an asymptotic relationship approaching a constant value as the number of memory elements increases.

24. The method of claim 22, further comprising specifying an average value of a first smaller contained region of memory elements by calculating the arithmetic difference between the average memory content value of a larger region and the average memory content value of the first smaller contained region.

25. The method of claim 24, further comprising creating a compressed representation of the memory contents of a contiguous region of memory elements by producing multiple average values derived from a first larger region down to a plurality of smaller regions contained therein.

26. The method of claim 25, wherein the average values are of decreasing significant digits as the regions examined decrease and resulting a compressed representation of the memory contents.

27. A method for writing to a variable-resolution memory comprising:
receiving a data file containing content at full resolution;
transforming the representation of the data file to a two-dimensional representation to be aggregated over different contiguous regions and provided at different resolutions; and
converting the input data file into a format based upon accessing the variable-resolution memory as a two-dimensional-array.

28. The method of claim 27, wherein the data file is an image and the two-dimensional array is an array of pixels.

29. The method of claim 27, wherein the data file is a sound file stored in a two-dimensional array having a first dimension representing time and another dimension representing an intensity of frequencies over time.

30. The method of claim 27, wherein the data file is a radar image of targets stored in a two-dimensional array having a first dimension representing distance and another dimension representing an angle of a target from a particular vantage point.

31. A memory apparatus comprising:
means for reading memory content values from one or more of the memory elements in a contiguous region of the array according to a desired memory readout resolution;
means for aggregating the memory content values of the memory elements in the contiguous region to produce an aggregate memory content value; and
means for normalizing the aggregate memory content value by sealing it according to the number of memory elements in the contiguous region to produce a representative memory content value of the desired memory readout resolution.

* * * * *

UNITED STATES PATENT AND TRADEMARK OFFICE
CERTIFICATE OF CORRECTION

PATENT NO. : 7,391,635 B2 Page 1 of 1
APPLICATION NO. : 11/265397
DATED : June 24, 2008
INVENTOR(S) : Warren Bruce Jackson It is certified that error appears in the above-identified patent and that said Letters Patent is hereby corrected as shown below:

In column 12, lines 21-22, in Claim 2, delete "contest" and insert -- content --, therefor.

In column 13, line 1, in Claim 12, delete "comprising:" and insert -- comprising --, therefor.

In column 13, line 4, in Claim 12, delete "contest" and insert -- content --, therefor.

In column 13, line 17, in Claim 16, delete "comprising:" and insert -- comprising --, therefor.

In column 14, line 50, in Claim 31, delete "sealing" and insert -- scaling --, therefor.

Signed and Sealed this

Tenth Day of March, 2009

JOHN DOLL
*Acting Director of the United States Patent and Trademark Office*